(12) United States Patent
Hirano et al.

(10) Patent No.: US 11,167,266 B2
(45) Date of Patent: Nov. 9, 2021

(54) HYDRODESULFURIZATION CATALYST FOR HYDROCARBON OIL AND METHOD FOR MANUFACTURING HYDRODESULFURIZATION CATALYST

(71) Applicants: ENEOS Corporation, Tokyo (JP); JGC Catalysts and Chemicals Ltd., Kanagawa (JP)

(72) Inventors: Tomohisa Hirano, Tokyo (JP); Masanori Yoshida, Tokyo (JP); Hiroyuki Seki, Tokyo (JP); Tomoyasu Kagawa, Fukuoka (JP); Mitsunori Watabe, Fukuoka (JP)

(73) Assignees: ENEOS CORPORATION, Tokyo (JP); JGC CATALYSTS AND CHEMICALS LTD., Kanagawa (JP)

( * ) Notice: Subject to any disclaimer, the term of this patent is extended or adjusted under 35 U.S.C. 154(b) by 23 days.

(21) Appl. No.: 16/497,915

(22) PCT Filed: Mar. 9, 2018

(86) PCT No.: PCT/JP2018/009275
§ 371 (c)(1),
(2) Date: Sep. 26, 2019

(87) PCT Pub. No.: WO2018/180377
PCT Pub. Date: Oct. 4, 2018

(65) Prior Publication Data
US 2021/0121853 A1 Apr. 29, 2021

(30) Foreign Application Priority Data

Mar. 30, 2017 (JP) .............................. JP2017-067825

(51) Int. Cl.
*B01J 21/04* (2006.01)
*B01J 21/06* (2006.01)
(Continued)

(52) U.S. Cl.
CPC ............ *B01J 21/04* (2013.01); *B01J 21/063* (2013.01); *B01J 35/006* (2013.01);
(Continued)

(58) Field of Classification Search
CPC . B01J 21/04; B01J 21/063; B01J 21/08; B01J 21/12; B01J 35/1019; B01J 35/1038
See application file for complete search history.

(56) References Cited

U.S. PATENT DOCUMENTS

| | | |
|---|---|---|
| 2012/0181219 A1 | 7/2012 | Seki et al. |
| 2013/0153467 A1 | 6/2013 | Seki et al. |

FOREIGN PATENT DOCUMENTS

| | | |
|---|---|---|
| JP | 2011-72928 | 4/2011 |
| JP | 2012-005976 | 1/2012 |

(Continued)

OTHER PUBLICATIONS

International Search Report issued in International Patent Application No. PCT/JP2018/009275, dated May 15, 2018, English translation.

(Continued)

*Primary Examiner* — Renee Robinson

(74) *Attorney, Agent, or Firm* — Greenblum & Bernstein, P.L.C.

(57) ABSTRACT

Provided is a hydrodesulfurization catalyst for hydrocarbon oil, the catalyst comprising: an inorganic oxide carrier comprising Si, Ti and Al; and at least one metal component, carried on the inorganic oxide carrier, being selected from the group consisting of group 6 elements, group 8 elements, (Continued)

group 9 elements and group 10 elements, wherein the content of Al in the inorganic oxide carrier is 50% by mass or higher in terms of $Al_2O_3$; the content of Si therein is 1.0 to 10% by mass in terms of $SiO_2$; and the content of Ti therein is 12 to 28% by mass in terms of $TiO_2$; and in the inorganic oxide carrier, the absorption edge wavelength of an absorption peak from Ti is 364 nm or shorter as measured by ultraviolet spectroscopy.

6 Claims, 1 Drawing Sheet

(51) Int. Cl.
    *B01J 35/10*     (2006.01)
    *B01J 35/00*     (2006.01)
    *C10G 45/08*     (2006.01)
    *B01J 37/04*     (2006.01)
    *B01J 37/08*     (2006.01)

(52) U.S. Cl.
    CPC ....... *B01J 35/1019* (2013.01); *B01J 35/1038* (2013.01); *B01J 37/04* (2013.01); *B01J 37/08* (2013.01); *C10G 45/08* (2013.01); *C01P 2002/84* (2013.01)

(56) References Cited

FOREIGN PATENT DOCUMENTS

| | | |
|---|---|---|
| JP | 2015-196134 A | 11/2015 |
| JP | 2016-203074 | 12/2016 |
| WO | 2011/040224 | 4/2011 |
| WO | 2015/146822 | 10/2015 |

OTHER PUBLICATIONS

International Preliminary Report on Patentability issued in International Patent Application No. PCT/JP2018/009275, dated Oct. 10, 2019, English translation.

EESR issued in EP Patent Application No. 18777519.2, Nov. 13, 2020.

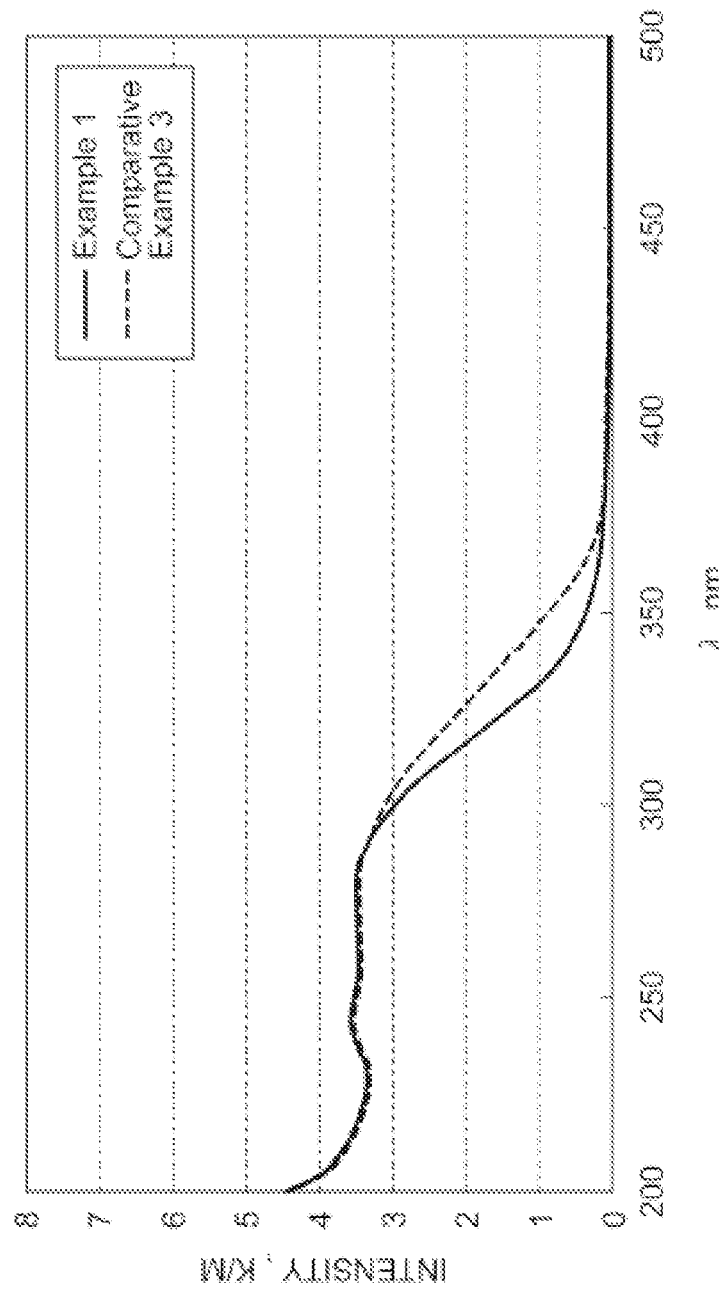

HYDRODESULFURIZATION CATALYST FOR HYDROCARBON OIL AND METHOD FOR MANUFACTURING HYDRODESULFURIZATION CATALYST

TECHNICAL FIELD

The present invention relates to a hydrodesulfurization catalyst for hydrocarbon oil and a method for producing a hydrodesulfurization catalyst.

BACKGROUND ART

Quality regulations of a sulfur content in fuel oils are presently strengthened from the viewpoint of the environmental protection. In particular, a sulfur content in gas oil is an object of a strict regulation. Hence, the development of a catalyst is in progress, which has a high desulfurization performance so as to be capable of meeting the regulation (for example, see Patent Literature 1).

CITATION LIST

Patent Literature

Patent Literature 1: Japanese Unexamined Patent Publication No. 2011-72928

SUMMARY OF INVENTION

Technical Problem

The present invention has an object to provide a hydrodesulfurization catalyst that exhibits a high desulfurization performance and simultaneously stably retains the desulfurization performance for a long period.

Solution to Problem

The present invention provides a hydrodesulfurization catalyst for hydrocarbon oil, the catalyst comprising: an inorganic oxide carrier comprising Si, Ti and Al; and at least one metal component, carried on the inorganic oxide carrier, being selected from the group consisting of group 6 elements, group 8 elements, group 9 elements and group 10 elements, wherein the content of Al in the inorganic oxide carrier is 50% by mass or higher in terms of $Al_2O_3$, the content of Si therein is 1.0 to 10% by mass in terms of $SiO_2$, and the content of Ti therein is 12 to 28% by mass in terms of $TiO_2$; and in the inorganic oxide carrier, an absorption edge wavelength of an absorption peak from Ti is 364 nm or shorter as measured by ultraviolet spectroscopy.

In one aspect, the hydrodesulfurization catalyst according to the present invention has a specific surface area (SA) of 150 $m^2/g$ or larger, and a pore volume (PV) of 0.30 ml/g or larger.

In another aspect, the metal component comprises at least one selected from the group consisting of molybdenum, tungsten, cobalt and nickel.

In further another aspect, the content of the metal component is 1 to 35% by mass in terms of oxide.

Further, the present invention provides a method for producing the above-mentioned hydrodesulfurization catalyst according to the present invention, the method comprising a step of mixing a first aqueous solution comprising a mineral acid salt of titanium and an acidic aluminum salt with a second aqueous solution comprising a basic aluminum salt to make a mixed liquid of pH 6.5 to 9.5 to thereby obtain a carrier precursor deposited in the mixed liquid, a step of calcining the carrier precursor to obtain a carrier, and a step of making the carrier to carry at least one metal component selected from the group consisting of group 6 elements, group 8 elements, group 9 elements and group 10 elements to obtain the hydrodesulfurization catalyst, wherein the first aqueous solution and/or the second aqueous solution comprises silicate ions.

In one aspect, the first aqueous solution is prepared at 60° C. or lower.

In another aspect, the period of time is 60 min or shorter from when the mineral acid salt of titanium and the acidic aluminum salt are mixed until when the first aqueous solution and the second aqueous solution are mixed.

Advantageous Effects of Invention

According to the present invention, there can be provided a hydrodesulfurization catalyst that exhibits a high desulfurization performance and simultaneously stably retains the desulfurization performance for a long period, and a method for producing the same.

BRIEF DESCRIPTION OF DRAWING

FIG. 1 is a diagram showing ultraviolet-visible light diffused reflection spectra of inorganic oxide carriers in Example 1 and Comparative Example 3.

DESCRIPTION OF EMBODIMENTS

Hereinafter, embodiments according to the present invention will be described in detail.

<Hydrodesulfurization Catalyst>

A hydrodesulfurization catalyst according to the present embodiment comprises an inorganic oxide carrier and a metal component carried on the inorganic oxide carrier.

(Inorganic Oxide Carrier)

The inorganic oxide carrier comprises Si, Ti and Al. The content of Al in terms of $Al_2O_3$ in the inorganic oxide carrier is 50% by mass or higher on the basis of the total amount of the inorganic oxide carrier. The content of Si in terms of $SiO_2$ in the inorganic oxide carrier is 1.0 to 10% by mass on the basis of the total amount of the inorganic oxide carrier. Further, the content of Ti in terms of $TiO_2$ in the inorganic oxide carrier is 12 to 28% by mass on the basis of the total amount of the inorganic oxide carrier.

The above content of Al is not especially limited as long as being 50% by mass or higher, but from the viewpoint of more enhancing desulfurization activity of the hydrodesulfurization catalyst, it is preferable that the content is 60% by mass or higher, and being 70% by mass or higher is more preferable. Then, the content of Al may be, for example, 85% by mass or lower.

The above content of Si is not especially limited as long as being 1.0 to 10% by mass, but from the viewpoint of more enhancing desulfurization activity of the desulfurization catalyst, it is preferable that the content is 1.5% by mass or higher; and being 2.0% by mass or higher is more preferable. Further from the viewpoint of uniformizing the pore diameter in the inorganic oxide carrier, it is preferable that the content of Si is 7.0% by mass or lower, and being 5.0% by mass or lower is more preferable.

The above content of Ti is not especially limited as long as being 12 to 28% by mass, but from the viewpoint of more enhancing desulfurization activity of the desulfurization catalyst, it is preferable that the content is 15% by mass or higher and the content may be 18% by mass or higher. Further from the viewpoint of effectively suppressing aggregation of $TiO_2$, it is preferable that the content of Ti is 25% by mass or lower; and the content may be 23% by mass or lower.

The inorganic oxide carrier may further comprise other elements in addition to Si, Ti and Al. Examples of the other elements include P, B and Zr. In the case where the inorganic oxide carrier comprises other elements, the content of the each element in terms of oxide of the each element may be, on the basis of the total amount of the inorganic oxide carrier, for example, 1.0% by mass or higher, and 20% by mass or lower.

In the inorganic oxide carrier, the absorption edge wavelength of an absorption peak derived from Ti as measured by ultraviolet spectroscopy is 364 nm or shorter. When the absorption edge wavelength is 364 nm or shorter, the dispersibility of $TiO_2$ particles in the carrier can be held good, and a high desulfurization performance is exhibited and the desulfurization performance can stably be retained for a long period. From such viewpoints, it is preferable that the absorption edge wavelength is 360 nm or shorter. On the other hand, the lower limit of the absorption edge wavelength is not especially limited, but from the viewpoint of fully securing the content of Ti in the carrier and holding the desulfurization activity good, the lower limit may be, for example, 330 nm or longer, or 335 nm or longer.

Here in the present description, the absorption edge wavelength of an absorption peak measured by ultraviolet spectroscopy refers to a wavelength indicating an absorption edge of an ultraviolet-visible light diffused reflection spectrum measured by an ultraviolet-visible spectrophotometer, and more specifically means the longest wavelength in wavelengths at which the value of the spectral intensity is 0.3 or higher when the absorption intensity is subjected to the K-M conversion using the Kubelka-Munk function (K-M function).

In the inorganic oxide carrier, the specific surface area (SA) measured by the BET method may be, for example, 280 $m^2/g$ or larger, and is preferably 290 $m^2/g$ or larger. When the specific surface area (SA) is 280 $m^2/g$ or larger, the metal component described later can be carried in a highly dispersed state and the reduction of the desulfurization performance can more effectively be suppressed. The specific surface area (SA) may be, for example, 450 $m^2/g$ or smaller, and is preferably 430 $m^2/g$ or smaller. When the specific surface area (SA) is 450 $m^2/g$ or smaller, the reduction of the catalyst strength can more effectively be suppressed.

In the inorganic oxide carrier, the pore volume (PV) measured by a pore-filling method using water may be, for example, 0.45 ml/g or larger, and is preferably 0.50 ml/g or larger. Further the pore volume (PV) may be, for example, 0.80 ml/g or smaller, and is preferably 0.70 ml/g or smaller. When the pore volume (PV) is 0.80 ml/g or smaller, the reduction of the catalyst strength can more effectively be suppressed.

(Metal Component)

In the present embodiment, the metal component carried on the above inorganic oxide carrier is at least one metal component selected from the group consisting of group 6 elements, group 8 elements, group 9 elements and group 10 elements. Here, the "group 6 elements", "group 8 elements", "group 9 elements" and "group 10 elements" are terms based on the long-period periodic table (the new periodic table) in the IUPAC format. Then sometimes based on the short-period periodic table (the old periodic table), the "group 6 elements" are termed "group VIA elements", and the "group 8 elements", "group 9 elements" and "group 10 elements" are generically termed "group VIII elements". The metal component of group 6 elements includes molybdenum (Mo) and tungsten (W); and the metal component of group 8 elements, group 9 elements and group 10 elements includes cobalt (Co) and nickel (Ni). These metal components may be used singly or concurrently in two or more.

The content of the metal component, on the basis of the total amount of the hydrodesulfurization catalyst, in terms of oxide, may be 1 to 35% by mass, and is preferably 15 to 30% by mass. It is preferable that in particular, the content of the metal component of group 6 elements is, on the basis of the total amount of the hydrodesulfurization catalyst, in terms of oxide, 10 to 30% by mass; and being 13 to 24% by mass is more preferable. Then it is preferable that the total of the contents of group 8 elements, group 9 elements and group 10 elements is, in terms of oxide, 1 to 10% by mass; and being 2 to 6% by mass is more preferable.

The hydrodesulfurization catalyst may comprise phosphorus; and in this case, it is preferable that the content of phosphorus is, on the basis of the total amount of the hydrodesulfurization catalyst, in terms of oxide ($P_2O_5$), 1 to 10% by mass; and being 2 to 6% by mass is more preferable.

In the hydrodesulfurization catalyst, the specific surface area (SA) measured by the BET method may be, for example, 150 $m^2/g$ or larger, and is preferably 170 $m^2/g$ or larger. When the specific surface area (SA) is 150 $m^2/g$ or larger, the active site of the desulfurization reaction can be retained and the reduction of the desulfurization performance can more effectively be suppressed. The specific surface area (SA) may be, for example, 250 $m^2/g$ or smaller, and is preferably 230 $m^2/g$ or smaller. When the specific surface area (SA) is 250 $m^2/g$ or smaller, the reduction of the catalyst strength can more effectively be suppressed.

In the hydrodesulfurization catalyst, the pore volume (PV) measured by the pore-filling method using water may be, for example, 0.30 ml/g or larger, and is preferably 0.35 ml/g or larger. The pore volume (PV) may be, for example, 0.60 ml/g or smaller, and is preferably 0.50 ml/g or smaller. When the pore volume (PV) is 0.60 ml/g or smaller, the reduction of the catalyst strength can more effectively be suppressed.

The hydrodesulfurization catalyst according to the present embodiment is suitably used for a hydrotreatment of hydrocarbon oil, particularly gas oil fractions. A hydrodesulfurization treatment using the hydrodesulfurization catalyst according to the present embodiment is carried out, for example, by using a fixed-bed reactor packed with the catalyst, and in a hydrogen atmosphere and under a high-temperature high-pressure condition.

The gas oil fractions include straight-run gas oil obtained from crude oil by an atmospheric distillation apparatus, vacuum gas oil obtained by processing straight-run heavy oil or residual oil obtained by an atmospheric distillation apparatus, by a vacuum distillation apparatus, catalytically cracked gas oil obtained by catalytically cracking vacuum heavy gas oil or desulfurized fuel oil, and hydrocracked gas oil obtained by hydrocracking vacuum heavy gas oil or desulfurized fuel oil.

It is preferable that the reaction pressure (hydrogen partial pressure) is 3 to 15 MPa; and more preferable is being 4 to 10 MPa. When the reaction pressure is lower than 3 MPa, since desulfurization and denitrification are likely to remarkably reduce; and when the reaction pressure exceeds 15

MPa, since hydrogen consumption increases and operational costs increase, the cases are not preferable.

It is preferable that the reaction temperature is 300 to 420° C.; and more preferable is being 320 to 380° C. When the reaction temperature is lower than 300° C., since desulfurization and denitrification activities are likely to remarkably reduce, the case is not practical. When the reaction temperature exceeds 420° C., since the catalyst degradation becomes remarkable and the temperature approaches to the heat-resistant temperature (usually about 425° C.) of the reaction apparatus, the case is not preferable.

The liquid space velocity is not especially limited, but being 0.5 to 4.0 h$^{-1}$ is preferable; and more preferable is 0.5 to 2.0 h$^{-1}$. When the liquid space velocity is lower than 0.5 h$^{-1}$, since the amount processed is small, the productivity becomes low, so the case is not practical. When the liquid space velocity exceeds 4.0 h$^{-1}$, since the reaction temperature becomes high and the catalyst degradation becomes fast, the case is not preferable.

It is preferable that the hydrogen/oil ratio is 120 to 420 NL/L; and more preferable is being 170 to 340 NL/L. When the hydrogen/oil ratio is lower than 120 NL/L, since the desulfurization ratio reduces, the case is not preferable. Even when the ratio exceeds 420 NL/L, since the desulfurization activity makes no large change and only the operational costs increase, the case is not preferable.

<Method for Producing the Hydrodesulfurization Catalyst>

A method for producing the above-mentioned hydrodesulfurization catalyst according to the present embodiment will be described. The method for producing the hydrodesulfurization catalyst according to the present embodiment comprises a step (hereinafter, referred to also as "first step") of mixing a first aqueous solution comprising a mineral acid salt of titanium and an acidic aluminum salt with a second aqueous solution comprising a basic aluminum salt to make a mixed liquid of pH 6.5 to 9.5 to thereby obtain a carrier precursor deposited in the mixed liquid, a step (hereinafter, referred to also as "second step") of calcining the carrier precursor to obtain a carrier, and a step (hereinafter, referred to also as "third step") of making the carrier to carry at least one metal component selected from the group consisting of group 6 elements, group 8 elements, group 9 elements and group 10 elements to obtain the hydrodesulfurization catalyst. Hereinafter, each of the steps will be described.

(First Step)

The first step is a step of mixing a first aqueous solution comprising a mineral acid salt of titanium and an acidic aluminum salt with a second aqueous solution comprising a basic aluminum salt to make a mixed liquid of pH 6.5 to 9.5 to obtain a carrier precursor deposited in the mixed liquid. Here, the first aqueous solution is usually an acidic aqueous solution; and the second aqueous solution is usually a basic aqueous solution.

Examples of the mineral acid salt of titanium contained in the first aqueous solution include titanium tetrachloride, titanium trichloride, titanium sulfate and titanium nitrate; and particularly titanium sulfate is, since being inexpensive, suitably used. Then the acidic aluminum salt includes aluminum sulfate, aluminum chloride and aluminum nitrate. Then examples of the basic aluminum salt contained in the second aqueous solution include sodium aluminate and potassium aluminate.

Further in the first step, the first aqueous solution and/or the second aqueous solution comprises silicate ions, but the timing when the silicate ions (silicate compound) are added to the first aqueous solution and/or the second aqueous solution is not especially limited. For example, the first aqueous solution may be prepared by substantially simultaneously adding and mixing the mineral acid salt of titanium, the acidic aluminum salt and the silicate ions; or the first aqueous solution may be made by previously preparing an aqueous solution containing the mineral acid salt of titanium and the acidic aluminum salt and adding and mixing the silicate ions with the solution right before the first aqueous solution is mixed with the second aqueous solution. Similarly, the second aqueous solution may be prepared by substantially simultaneously adding and mixing the basic aluminum salt and the silicate ions; or the second aqueous solution may be made by previously preparing an aqueous solution containing the basic aluminum salt, and adding and mixing the silicate ions with the solution right before the second aqueous solution is mixed with the first aqueous solution.

The contents of the mineral acid salt of titanium and the acidic aluminum salt contained in the first aqueous solution, the basic aluminum salt contained in the second aqueous solution, and the silicate ions contained in the first aqueous solution and/or the second aqueous solution are not especially limited, and can suitably be prepared so that the content of Al of the inorganic oxide carrier obtained in the second step to be described later becomes 50% by mass or higher in terms of $Al_2O_3$; the content of Si thereof, 1.0 to 10% by mass in terms of $SiO_2$; and the content of Ti thereof, 12 to 28% by mass in terms of $TiO_2$.

In the case where the first aqueous solution contains silicate ions, as a silicate compound to be used, for example, an acidic or neutral silicate compound may be used. Examples of the acidic silicate compound include silicic acid. Alternatively, in the case where the second aqueous solution contains silicate ions, as a silicate compound to be used, for example, a basic or neutral silicate compound may be used. Examples of the basic silicate compound include sodium silicate.

The condition in preparation of the first aqueous solution is not especially limited, but from the viewpoint of securing the stability of the mineral acid salt of titanium in the first aqueous solution, for example, it is preferable that the temperature in the preparation is made to be 60° C. or lower. Further the temperature in preparation of the first aqueous solution, from the viewpoint of making it easy for the mineral acid salt of titanium to be dissolved, may be, for example, room temperature (23° C.) or higher; and being 30° C. or higher is preferable.

In the first step, the pH of the mixed liquid obtained by mixing the first aqueous solution and the second aqueous solution is 6.5 to 9.5. By making the pH of the mixed liquid in the above numerical range, the carrier precursor can stably be deposited in the mixed liquid. It is preferable that the pH of the mixed liquid is 6.5 to 8.5; and being 6.5 to 7.5 is more preferable. Thereby, removal of impurities from the carrier precursor is made easy.

A method of mixing the first aqueous solution and the second aqueous solution is not especially limited, and there can be used, for example, a method of adding the second aqueous solution to the first aqueous solution and mixing the resultant, a method of adding the first aqueous solution to the second aqueous solution and mixing the resultant, or the like. Alternatively, the first aqueous solution and the second aqueous solution may be mixed collectively, or one of the aqueous solutions may be continuously added to the other aqueous solution. In the case of the continuous addition, the time from when the addition is started until when the addition is completed is not especially limited, and may be, for example, 5 to 20 min, or may also be 7 to 15 min. In particular, in the case where the first aqueous solution is added to the second aqueous solution and mixed, from the viewpoint of sufficiently suppressing formation of pseudo-boehmite and besides, crystalline substances such as bayerite and gibbsite, and more effectively securing the specific surface area of the obtained hydrorefining catalyst, it is preferable that the period of time is 13 min or shorter.

In the first step, from the viewpoint of more effectively regulating the absorption edge wavelength of the inorganic oxide carrier, the time from when the mineral acid salt of titanium and the acidic aluminum salt are mixed until when the first aqueous solution and the second aqueous solution are mixed may also be made to be, for example, 60 min or shorter. Here, the time until when the first aqueous solution and the second aqueous solution are mixed means, in the case where one of the aqueous solutions is continuously added to the other aqueous solution, the time until the addition is completed. By making the time to be 60 min or shorter from when the mineral acid salt of titanium and the acidic aluminum salt are mixed until when the first aqueous solution and the second aqueous solution are mixed, aggregation of $TiO_2$ particles in the first aqueous solution can more effectively be suppressed and the dispersibility of the $TiO_2$ particles in the inorganic oxide carrier can be held better. From such a viewpoint, it is more preferable that the period of time is 50 min or shorter from when the mineral acid salt of titanium and the acidic aluminum salt are mixed until when the first aqueous solution and the second aqueous solution are mixed; and being 40 min or shorter is still more preferable.

Other conditions when the first aqueous solution and the second aqueous solution are mixed are not especially limited. For example, in the case where the first aqueous solution is added to the second aqueous solution, the first aqueous solution and the second aqueous solution may be mixed by charging the second aqueous solution in a vessel equipped with a stirrer, and heating the solution usually at 40 to 80° C., preferably at 55 to 70° C. and holding the temperature, and adding the first aqueous solution heated at a temperature of ±5° C., preferably ±2° C., more preferably ±1° C. of the temperature of the second aqueous solution.

(Second Step)

The second step is a step of calcining the carrier precursor obtained in the above first step to thereby obtain the carrier (inorganic oxide carrier).

The condition of calcining the carrier precursor is not especially limited, but for example, the calcining temperature may be 400 to 700° C., may also be 450 to 600° C., or may also be 500 to 570° C. Then, the calcining time may be, for example, 0.5 to 10 hours, or may also be 2 to 5 hours.

As a carrier precursor to be fed to calcining, there may also be used, as desired, one prepared by heating and kneading the above-mentioned carrier precursor into a moldable kneaded material, thereafter molding the resultant into a desired shape by extrusion or the like, and drying the resultant, for example, at 70 to 150° C., preferably at 90 to 130° C.

Further when the carrier precursor is calcined, as desired, the carrier precursor may be washed in order to remove by-product salts, or the carrier precursor may be aged. Examples of washing liquids for washing the carrier precursor include an ammonia aqueous solution. Then examples of aging methods include a method in which aging is carried out under stirring at 80 to 120° C. for 5 to 20 hours by using an aging tank equipped with a refluxing device.

(Third Step)

The third step is a step of making the carrier (inorganic oxide carrier) obtained in the above second step to carry at least one metal component selected from the group consisting of group 6 elements, group 8 elements, group 9 elements and group 10 elements to obtain the hydrodesulfurization catalyst.

A method of making the carrier to carry the metal component is not especially limited, and there can be used means such as an impregnation method or a dipping method. Examples of raw material metal compounds for making the carrier to carry the metal component include nickel nitrate, nickel carbonate, cobalt nitrate, cobalt carbonate, molybdenum trioxide, ammonium molybdate and ammonium paratungstate.

In the case where the metal component carried on the carrier contains a metal component of a group 6 element, it is preferable to dissolve the metal component by using an acid. In this case, the acid includes phosphoric acid and organic acids. In the case of using phosphoric acid, from the viewpoint of retaining the catalytic performance and simultaneously ensuring stable dissolvability, the content of phosphoric acid may be, with respect to 100 parts by mass of the metal component of a group 6 element, in terms of oxide, 3 to 25 parts by mass, and may be 10 to 15 parts by mass.

In the third step, the hydrodesulfurization catalyst may be prepared by making the carrier to carry the metal component by the above-mentioned method, and thereafter, as desired, calcining the resultant. The calcining condition is not especially limited, and for example, the calcining temperature may be 400 to 700° C., may also be 450 to 600° C., or may also be 500 to 570° C. Further the calcining time may be, for example, 0.5 to 10 hours, or may also be 2 to 5 hours.

Hitherto, the hydrodesulfurization catalyst according to the present embodiment and the production method thereof have been described, but the present invention is not any more limited to the above embodiment.

For example, in the production of the hydrodesulfurization catalyst, by subjecting the hydrodesulfurization catalyst obtained in the above third step to a pre-sulfurization treatment in a reaction apparatus, a pre-sulfurized hydrodesulfurization catalyst can be produced. More specifically, a pre-sulfurized hydrodesulfurization catalyst may be obtained by carrying out a pre-sulfurization treatment on the hydrodesulfurization catalyst, in which treatment the hydrodesulfurization catalyst is brought into contact with a mixed oil prepared by mixing a petroleum distillate (hydrocarbon oil) containing sulfur compounds with a sulfurizing agent (dimethyl sulfide, dimethyl disulfide, carbon disulfide or the like), in a hydrogen atmosphere at 200 to 400° C. (preferably 240 to 340° C.) at atmospheric or higher pressure in hydrogen partial pressure (for example, 2 to 15 MPa); or a pre-sulfurized hydrodesulfurization catalyst may be obtained by simply bringing the hydrodesulfurization catalyst and hydrogen sulfide into contact with each other under the same condition as in the above.

By carrying out the pre-sulfurization treatment under the above condition on the hydrodesulfurization catalyst, while the sulfidity of the carried metal is held at a high level, the number of lamination of crystal phases of a metal sulfide can be retained in a certain range and better desulfurization activity can be exhibited.

EXAMPLES

Hereinafter, the content of the present invention will be described more specifically by way of Examples and Comparative Examples, but the present invention is not any more limited to these Examples.

Example 1

<Preparation of a Carrier Precursor>

8.16 kg of a sodium aluminate aqueous solution (manufactured by JGC Catalysts and Chemicals Ltd.) of 22% by mass in terms of $Al_2O_3$ was charged in a 100-L volume tank equipped with a steam jacket, and diluted with 41.0 kg of ion-exchange water; thereafter, 1.80 kg of a sodium silicate solution (manufactured by AGC Si-Tech Co., Ltd., $SiO_2$ concentration: 24% by mass) of 5.0% by mass in terms of $SiO_2$ was added under stirring, and heated at 60° C. to thereby prepare a second aqueous solution containing a basic aluminum salt.

A solution A prepared by diluting 7.38 kg of an aluminum sulfate aqueous solution (manufactured by JGC Catalysts and Chemicals Ltd.) of 7.0% by mass in terms of $Al_2O_3$ with 13.0 kg of ion-exchange water, and a solution B prepared by dissolving 1.82 kg of titanyl sulfate (manufactured by Tayca Corp.) of 33% by mass in terms of $TiO_2$ in 10.0 kg of ion-exchange water were mixed, and heated at 50° C. to thereby prepare a first aqueous solution containing a mineral acid salt of titanium and an acidic aluminum salt.

Then, the first aqueous solution was added in the tank containing the second aqueous solution at a certain rate until the pH became 7.2 over 10 min by using a roller pump to thereby obtain a mixed liquid (slurry) having the carrier precursor (hydrate) a deposited therein. Here, the time was 30 min from when the solution A and the solution B were mixed until when the addition of the first aqueous solution in the second aqueous solution was completed (the time of completion of the addition).

<Preparation of an Inorganic Oxide Carrier>

The obtained mixed liquid was stirred at 60° C. for 1 hour, thereafter dehydrated by using a plate filter, and further washed with 150 L of a 0.3-mass % ammonia aqueous solution. The carrier precursor a after the washing in a cake state was diluted with ion-exchange water so as to make a concentration of 10% by mass in terms of $Al_2O_3$, and thereafter controlled to a pH of 10.5 with a 15-mass % ammonia water. The obtained diluted liquid was transferred to an aging tank equipped with a reflux device, and aged under stirring at an aging temperature of 95° C. for 10 hours. The mixed liquid after the finish of the aging was dehydrated, and kneaded by a double-armed kneader equipped with a steam jacket to be concentrated to a predetermined water content. The obtained kneaded material was molded into a cylindrical shape of 1.8 mm in diameter by an extruding machine, and dried at 110° C. The dried molded product was calcined at a temperature of 550° C. for 3 hours in an electric furnace to thereby obtain an inorganic oxide carrier a containing Si, Ti and Al.

The inorganic oxide carrier a contained, on the basis of the total amount of the carrier, Al of 77% by mass in terms of $Al_2O_3$, Si of 3.0% by mass in terms of $SiO_2$, and Ti of 20% by mass in terms of $TiO_2$. Then, the properties (pore volume (PV) and specific surface area (SA)) of the inorganic oxide carrier a were measured according to the following methods.

Further, the ultraviolet-visible light diffused reflection spectrum of the inorganic oxide carrier a was analyzed according to the following method. The analysis result is shown in FIG. 1. The absorption edge wavelength of the inorganic oxide carrier a was calculated from the analysis result, and was 346 nm.

<Preparation of a Hydrodesulfurization Catalyst>

Then, 267 g of molybdenum trioxide (manufactured by Climax Molybdenum Co., $MoO_3$ concentration: 99% by mass) and 54 g of cobalt carbonate (manufactured by Tanaka Chemical Corp., CoO concentration: 61% by mass) were suspended in 500 ml of ion-exchange water; and the suspension liquid was heated at 95° C. for 5 hours with a suitable reflux device provided so the liquid volume as not to reduce; thereafter, 54 g of phosphoric acid (manufactured by Kanto Chemical Co., Inc., $P_2O_5$ concentration: 62% by mass) was added to the suspension liquid and dissolved therein to prepare an impregnating liquid. The obtained impregnating liquid was sprayed and impregnated in 1000 g of the above inorganic oxide carrier a, thereafter dried at 250° C., and calcined at a calcining temperature of 550° C. for 1 hour in an electric furnace to thereby obtain a hydrodesulfurization catalyst a.

The metal component in the hydrodesulfurization catalyst a contained, on the basis of the total amount of the catalyst, 20% by mass of $MoO_3$, 2.5% by mass of CoO and 2.5% by mass of $P_2O_5$.

The measurements of the properties (pore volume (PV) and specific surface area (SA)) of the hydrodesulfurization catalyst a, and the hydrodesulfurization activity test and the stability test of the hydrodesulfurization activity of the hydrodesulfurization catalyst a were carried out according to the following methods. Each property is collectively shown in Table 1.

Example 2

<Preparation of a Carrier Precursor>

A mixed liquid having a carrier precursor b deposited therein was obtained by the same method as in Example 1.

<Preparation of an Inorganic Oxide Carrier>

An inorganic oxide carrier b was prepared, and the properties (pore volume (PV) and specific surface area (SA)) were measured, by the same methods as in Example 1, except for, in preparation of the inorganic oxide carrier, altering the temperature when the diluted liquid was transferred to the aging tank equipped with the reflux device, and aged under stirring for 10 hours, to 65° C. The inorganic oxide carrier b contained, on the basis of the total amount of the carrier, Al of 77% by mass in terms of $Al_2O_3$, Si of 3.0% by mass in terms of $SiO_2$, and Ti of 20% by mass in terms of $TiO_2$. Then, the absorption edge wavelength of the inorganic oxide carrier b was calculated by the same method as in Example 1, and was 351 nm.

<Preparation of a Hydrodesulfurization Catalyst>

A hydrodesulfurization catalyst b was obtained from the inorganic oxide carrier b by the same method as in Example 1. The metal component in the hydrodesulfurization catalyst b contained, on the basis of the total amount of the catalyst, 20% by mass of $MoO_3$, 2.5% by mass of CoO and 2.5% by mass of $P_2O_5$. Further, the measurements of the properties (pore volume (PV) and specific surface area (SA)) of the hydrodesulfurization catalyst b, and the hydrodesulfurization activity test and the stability test of the hydrodesulfurization activity of the hydrodesulfurization catalyst b were carried out by the same methods as in Example 1. Each property is collectively shown in Table 1.

Example 3

<Preparation of a Carrier Precursor>

7.99 kg of the sodium aluminate aqueous solution (manufactured by JGC Catalysts and Chemicals Ltd.) of 22% by mass in terms of $Al_2O_3$ was charged in the 100-L volume tank equipped with the steam jacket, and diluted with 42.0 kg of ion-exchange water; thereafter, 1.80 kg of the sodium silicate solution (manufactured by AGC Si-Tech Co., Ltd., $SiO_2$ concentration: 24% by mass) of 5.0% by mass in terms of $SiO_2$ was added under stirring, and heated at 60° C. to thereby prepare a second aqueous solution containing a basic aluminum salt.

A solution A prepared by diluting 5.76 kg of the aluminum sulfate aqueous solution (manufactured by JGC Catalysts and Chemicals Ltd.) of 7.0% by mass in terms of $Al_2O_3$ with 10.0 kg of ion-exchange water, and a solution B prepared by dissolving 2.27 kg of the titanyl sulfate (manufactured by Tayca Corp.) of 33% by mass in terms of $TiO_2$ in 13.0 kg of ion-exchange water were mixed, and heated at 50° C. to thereby prepare a first aqueous solution containing a mineral acid salt of titanium and an acidic aluminum salt. Hereinafter, by the same method as in Example 1, a mixed liquid having a carrier precursor c deposited therein was obtained.

<Preparation of an Inorganic Oxide Carrier>

An inorganic oxide carrier c was prepared from the carrier precursor c, and the properties (pore volume (PV) and specific surface area (SA)) were measured, by the same methods as in Example 1. The inorganic oxide carrier c contained, on the basis of the total amount of the carrier, Al of 72% by mass in terms of $Al_2O_3$, Si of 3.0% by mass in terms of $SiO_2$, and Ti of 25% by mass in terms of $TiO_2$. Then, the absorption edge wavelength of the inorganic oxide carrier c was calculated by the same method as in Example 1, and was 359 nm.

<Preparation of a Hydrodesulfurization Catalyst>

A hydrodesulfurization catalyst c was obtained from the inorganic oxide carrier c by the same method as in Example 1. The metal component in the hydrodesulfurization catalyst c contained, on the basis of the total amount of the catalyst, 20% by mass of $MoO_3$, 2.5% by mass of CoO and 2.5% by mass of $P_2O_5$. Further, the measurements of the properties (pore volume (PV) and specific surface area (SA)) of the hydrodesulfurization catalyst c, and the hydrodesulfurization activity test and the stability test of the hydrodesulfurization activity of the hydrodesulfurization catalyst c were carried out by the same methods as in Example 1. Each property is collectively shown in Table 1.

Example 4

<Preparation of a Carrier Precursor>

8.32 kg of the sodium aluminate aqueous solution (manufactured by JGC Catalysts and Chemicals Ltd.) of 22% by mass in terms of $Al_2O_3$ was charged in the 100-L volume tank equipped with the steam jacket, and diluted with 39.0 kg of ion-exchange water, thereafter, 1.80 kg of the sodium silicate solution (manufactured by AGC Si-Tech Co., Ltd., $SiO_2$ concentration: 24% by mass) of 5.0% by mass in terms of $SiO_2$ was added under stirring, and heated at 60° C. to thereby prepare a second aqueous solution containing a basic aluminum salt.

A solution A prepared by diluting 9.00 kg of the aluminum sulfate aqueous solution (manufactured by JGC Catalysts and Chemicals Ltd.) of 7.0% by mass in terms of $Al_2O_3$ with 16.0 kg of ion-exchange water, and a solution B prepared by dissolving 1.36 kg of the titanyl sulfate (manufactured by Tayca Corp.) of 33% by mass in terms of $TiO_2$ in 7.64 kg of ion-exchange water were mixed, and heated at 50° C. to thereby prepare a first aqueous solution containing a mineral acid salt of titanium and an acidic aluminum salt. Hereinafter, by the same method as in Example 1, a mixed liquid having a carrier precursor d deposited therein was obtained.

<Preparation of an Inorganic Oxide Carrier>

An inorganic oxide carrier d was prepared from the carrier precursor d, and the properties (pore volume (PV) and specific surface area (SA)) were measured, by the same methods as in Example 1. The inorganic oxide carrier d contained, on the basis of the total amount of the carrier, Al of 82% by mass in terms of $Al_2O_3$, Si of 3.0% by mass in terms of $SiO_2$, and Ti of 15% by mass in terms of $TiO_2$. Then, the absorption edge wavelength of the inorganic oxide carrier d was calculated by the same method as in Example 1, and was 335 nm.

<Preparation of a Hydrodesulfurization Catalyst>

A hydrodesulfurization catalyst d was obtained from the inorganic oxide carrier d by the same method as in Example 1. The metal component in the hydrodesulfurization catalyst d contained, on the basis of the total amount of the catalyst, 20% by mass of $MoO_3$, 2.5% by mass of CoO and 2.5% by mass of $P_2O_5$. Further, the measurements of the properties (pore volume (PV) and specific surface area (SA)) of the hydrodesulfurization catalyst d, and the hydrodesulfurization activity test and the stability test of the hydrodesulfurization activity of the hydrodesulfurization catalyst d were carried out by the same methods as in Example 1. Each property is collectively shown in Table 1.

Example 5

<Preparation of a Carrier Precursor>

A mixed liquid having a carrier precursor e deposited therein was obtained by the same method as in Example 1.

<Preparation of an Inorganic Oxide Carrier>

An inorganic oxide carrier e was prepared from the carrier precursor e, and the properties (pore volume (PV) and specific surface area (SA)) were measured, by the same methods as in Example 1. The inorganic oxide carrier e contained, on the basis of the total amount of the carrier, Al of 77% by mass in terms of $Al_2O_3$, Si of 3.0% by mass in terms of $SiO_2$, and Ti of 20% by mass in terms of $TiO_2$. Then, the absorption edge wavelength of the inorganic oxide carrier e was calculated by the same method as in Example 1, and was 346 nm.

<Preparation of a Hydrodesulfurization Catalyst>

272 g of the molybdenum trioxide (manufactured by Climax Molybdenum Co., $MoO_3$ concentration: 99% by mass), 37 g of nickel carbonate (manufactured by Seido Chemical Industry CO., Ltd., NiO concentration: 55% by mass) and 55 g of the cobalt carbonate (manufactured by Tanaka Chemical Corp., CoO concentration: 61% by mass) were suspended in 500 ml of ion-exchange water, and the suspension liquid was heated at 95° C. for 5 hours with a suitable reflux device provided so the liquid volume as not to reduce; thereafter, 55 g of the phosphoric acid (manufactured by Kanto Chemical Co., Inc., $P_2O_5$ concentration: 62% by mass) was added to the suspension liquid and dissolved therein to prepare an impregnating liquid.

Hereinafter, by the same method as in Example 1, a hydrodesulfurization catalyst e was obtained. The metal component in the hydrodesulfurization catalyst e contained, on the basis of the total amount of the catalyst, 20% by mass of $MoO_3$, 1.5% by mass of NiO, 2.5% by mass of CoO and 2.5% by mass of $P_2O_5$. Further, the measurements of the properties (pore volume (PV) and specific surface area (SA)) of the hydrodesulfurization catalyst e, and the hydrodesulfurization activity test and the stability test of the hydrodesulfurization activity of the hydrodesulfurization catalyst e were carried out by the same methods as in Example 1. Each property is collectively shown in Table 1.

Comparative Example 1

<Preparation of a Carrier Precursor>

8.49 kg of the sodium aluminate aqueous solution (manufactured by JGC Catalysts and Chemicals Ltd.) of 22% by mass in terms of $Al_2O_3$ was charged in the 100-L volume tank equipped with the steam jacket, and diluted with 37.0 kg of ion-exchange water, thereafter, 1.80 kg of the sodium silicate solution (manufactured by AGC Si-Tech Co., Ltd., $SiO_2$ concentration: 24% by mass) of 5.0% by mass in terms of $SiO_2$ was added under stirring, and heated at 60° C. to thereby prepare a second aqueous solution containing a basic aluminum salt.

A solution A prepared by diluting 10.6 kg of the aluminum sulfate aqueous solution (manufactured by JGC Catalysts and Chemicals Ltd.) of 7.0% by mass in terms of $Al_2O_3$ with 19.0 kg of ion-exchange water, and a solution B prepared by dissolving 0.910 kg of the titanyl sulfate (manufactured by Tayca Corp.) of 33% by mass in terms of $TiO_2$ in 5.10 kg of ion-exchange water were mixed, and heated at 50° C. to thereby prepare a first aqueous solution containing a mineral acid salt of titanium and an acidic aluminum salt. Hereinafter, by the same method as in Example 1, a mixed liquid having a carrier precursor f deposited therein was obtained.

<Preparation of an Inorganic Oxide Carrier>

An inorganic oxide carrier f was prepared from the carrier precursor f, and the properties (pore volume (PV) and specific surface area (SA)) were measured, by the same methods as in Example 1. The inorganic oxide carrier f contained, on the basis of the total amount of the carrier, Al of 87% by mass in terms of $Al_2O_3$, Si of 3.0% by mass in terms of $SiO_2$, and Ti of 10% by mass in terms of $TiO_2$. Then, the absorption edge wavelength of the inorganic oxide carrier f was calculated by the same method as in Example 1, and was 326 nm.

<Preparation of a Hydrodesulfurization Catalyst>

A hydrodesulfurization catalyst f was obtained from the inorganic oxide carrier f by the same method as in Example 1. The metal component in the hydrodesulfurization catalyst f contained, on the basis of the total amount of the catalyst, 20% by mass of $MoO_3$, 2.5% by mass of CoO and 2.5% by mass of $P_2O_5$. Further, the measurements of the properties (pore volume (PV) and specific surface area (SA)) of the hydrodesulfurization catalyst f, and the hydrodesulfurization activity test and the stability test of the hydrodesulfurization activity of the hydrodesulfurization catalyst f were carried out by the same methods as in Example 1. Each property is collectively shown in Table 1.

Comparative Example 2

<Preparation of a Carrier Precursor>

7.82 kg of the sodium aluminate aqueous solution (manufactured by JGC Catalysts and Chemicals Ltd.) of 22% by mass in terms of $Al_2O_3$ was charged in the 100-L volume tank equipped with the steam jacket, and diluted with 44.0 kg of ion-exchange water, thereafter, 1.80 kg of the sodium silicate solution (manufactured by AGC Si-Tech Co., Ltd., $SiO_2$ concentration: 24% by mass) of 5.0% by mass in terms of $SiO_2$ was added under stirring, and heated at 60° C. to thereby prepare a second aqueous solution containing a basic aluminum salt.

A solution A prepared by diluting 4.14 kg of the aluminum sulfate aqueous solution (manufactured by JGC Catalysts and Chemicals Ltd.) of 7.0% by mass in terms of $Al_2O_3$ with 7.45 kg of ion-exchange water, and a solution B prepared by dissolving 2.73 kg of the titanyl sulfate (manufactured by Tayca Corp.) of 33% by mass in terms of $TiO_2$ in 15.0 kg of ion-exchange water were mixed, and heated at 50° C. to thereby prepare a first aqueous solution containing a mineral acid salt of titanium and an acidic aluminum salt. Hereinafter, by the same method as in Example 1, a mixed liquid having a carrier precursor g deposited therein was obtained.

<Preparation of an Inorganic Oxide Carrier>

An inorganic oxide carrier g was prepared from the carrier precursor g, and the properties (pore volume (PV) and specific surface area (SA)) were measured, by the same methods as in Example 1. The inorganic oxide carrier g contained, on the basis of the total amount of the carrier, Al of 67% by mass in terms of $Al_2O_3$, Si of 3.0% by mass in terms of $SiO_2$, and Ti of 30% by mass in terms of $TiO_2$. Then, the absorption edge wavelength of the inorganic oxide carrier g was calculated by the same method as in Example 1, and was 379 nm.

<Preparation of a Hydrodesulfurization Catalyst>

A hydrodesulfurization catalyst g was obtained from the inorganic oxide carrier g by the same method as in Example 1. The metal component in the hydrodesulfurization catalyst g contained, on the basis of the total amount of the catalyst, 20% by mass of $MoO_3$, 2.5% by mass of CoO and 2.5% by mass of $P_2O_5$. Further, the measurements of the properties (pore volume (PV) and specific surface area (SA)) of the hydrodesulfurization catalyst g, and the hydrodesulfurization activity test and the stability test of the hydrodesulfurization activity of the hydrodesulfurization catalyst g were carried out by the same methods as in Example 1. Each property is collectively shown in Table 1.

Comparative Example 3

<Preparation of a Carrier Precursor>

A second aqueous solution and a first aqueous solution were prepared by the same methods as in Example 1.

Then, the first aqueous solution was added in the tank containing the second aqueous solution at a certain rate until the pH became 7.2 over 10 min by using a roller pump to thereby obtain a mixed liquid (slurry) having a carrier precursor (hydrate) h deposited therein. Here, the time was 90 min from when the solution A and the solution B were mixed until when the addition of the first aqueous solution in the second aqueous solution was completed.

<Preparation of an Inorganic Oxide Carrier>

An inorganic oxide carrier h was prepared from the carrier precursor h, and the properties (pore volume (PV) and specific surface area (SA)) were measured, by the same methods as in Example 1. The inorganic oxide carrier h contained, on the basis of the total amount of the carrier, Al of 77% by mass in terms of $Al_2O_3$, Si of 3.0% by mass in terms of $SiO_2$, and Ti of 20% by mass in terms of $TiO_2$.

The ultraviolet-visible light diffused reflection spectrum of the inorganic oxide carrier h was analyzed by the same method as in Example 1. The analysis result is shown in FIG. 1. The absorption edge wavelength of the inorganic oxide carrier h was calculated from the analysis result, and was 365 nm.

<Preparation of a Hydrodesulfurization Catalyst>

A hydrodesulfurization catalyst h was obtained from the inorganic oxide carrier h by the same method as in Example 1. The metal component in the hydrodesulfurization catalyst h contained, on the basis of the total amount of the catalyst, 20% by mass of $MoO_3$, 2.5% by mass of CoO and 2.5% by mass of $P_2O_5$. Further, the measurements of the properties (pore volume (PV) and specific surface area (SA)) of the hydrodesulfurization catalyst h, and the hydrodesulfurization activity test and the stability test of the hydrodesulfurization activity of the hydrodesulfurization catalyst h were carried out by the same methods as in Example 1. Each property is collectively shown in Table 1.

[Evaluation of Properties of the Inorganic Oxide Carriers]

<Measurement of Ultraviolet-Visible Light Diffused Reflection Spectra of the Inorganic Oxide Carriers and Calculation of Absorption Edges Thereof>

The ultraviolet-visible light diffused reflection spectra were measured by using an ultraviolet-visible light spectrometer (manufactured by JASCO Corp., V-660) and installing an integrating sphere unit ISV-772 for diffused reflection measurement, and as follows.

200 mg of one inorganic oxide carrier sample was filled in a cell holder for a diffused reflection sample, and thereafter the absorbance was measured at room temperature. Specifically, in the photometric mode, the band width was set at 5.0 nm; the measurement range, 500 to 200 nm; the data acquisition interval, 0.1 nm; the scanning rate, 100 nm/min; and the light source switching wavelength, 340 nm, and the background correction was made in the range of 500 to 200 nm. Here, the background measurement was carried out under the above conditions and by using a reference white plate.

A process of calculating the absorption edge from the above obtained diffused reflection spectrum involved subjecting the absorption intensity to the K-M conversion using the Kubelka-Munk function (K-M function), and calculating, as the absorption edge wavelength, the longest wavelength in wavelengths at which the value of the spectral intensity was 0.3 or higher.

<Measurement of the Pore Volume (PV) of the Inorganic Oxide Carriers>

The pore volume (PV) was measured and calculated by the pore-filling method using water.

<Measurement of the Specific Surface Area (SA) of the Inorganic Oxide Carriers>

The specific surface area (SA) was measured and calculated by the BET method using nitrogen adsorption by using a BERSORP-mini (manufactured by MicrotracBEL Corp., trade name).

[Evaluation of Properties of the Hydrodesulfurization Catalysts]

<Hydrodesulfurization Activity Test>

A reactor packed with one hydrodesulfurization catalyst was fixed to a fixed-bed flow hydrodesulfurization apparatus. Thereafter, pre-sulfurization of the catalyst was carried out by using hydrocarbon oil having a sulfur content concentration of 1% by mass under the conditions of a catalyst layer average temperature of 300° C., a hydrogen partial pressure of 6.0 MPa, a liquid space velocity of 1.0 $h^{-1}$ and a hydrogen/oil ratio of 200 NL/L, for 5 hours or longer.

A raw material oil having the following properties was subjected to hydrodesulfurization using a hydrodesulfurization apparatus, manufactured by Zytel Corp., by using the pre-sulfurized hydrodesulfurization catalyst. The hydrodesulfurization reaction was carried out under the following conditions. For each catalyst, the reaction rate constant at a reaction temperature of 350° C. was determined and a relative desulfurization activity was calculated with the reaction rate constant of the hydrodesulfurization catalyst a being taken to be 100.

(Property of the Raw Material Oil)

Raw material oil: a straight-run gas oil (boiling point range: 215 to 363° C.)

Density at 15° C.: 0.8515 g/cm$^3$

Sulfur content: 1.09% by mass

Nitrogen content: 120 ppm by mass (Reaction Condition)

Reaction temperature: 330° C. (1 day to 3 days after the operation startup)

335° C. (4 days to 6 days after the operation startup)

340° C. (7 days to 9 days after the operation startup)

345° C. (10 days to 12 days after the operation startup)

350° C. (13 days to 15 days after the operation startup)

Liquid space velocity: 1.36 hr

Hydrogen pressure: 6.0 MPa

Hydrogen/oil ratio: 200 NL/L

<Stability Test of Hydrodesulfurization Activity>

A reactor packed with one hydrodesulfurization catalyst was fixed to a fixed-bed flow hydrodesulfurization apparatus. Thereafter, pre-sulfurization of the catalyst was carried out by using hydrocarbon oil having a sulfur content concentration of 1% by mass under the conditions of a catalyst layer average temperature of 300° C., a hydrogen partial pressure of 4.5 MPa, a liquid space velocity of 1.0 $h^{-1}$ and a hydrogen/oil ratio of 200 NL/L, for 5 hours or longer.

A raw material oil having the following properties was subjected to hydrodesulfurization using a hydrodesulfurization apparatus, manufactured by Zytel Corp., by using the pre-sulfirized hydrodesulfurization catalyst. The hydrodesulfurization reaction was carried out under the following conditions. For each catalyst, the reaction rate constants on 5 days and 20 days after the operation startup were determined and the reaction rate constant on the 20 days thereafter was calculated with the reaction rate constant on the 5 days thereafter of the each catalyst being taken to be 100.

(Property of the Raw Material Oil)

Raw material oil: a straight-nm gas oil (boiling point range: 215 to 363° C.)

Density at 15° C.: 0.8515 g/cm$^3$

Sulfur content: 1.09% by mass

Nitrogen content: 120 ppm by mass (Reaction Condition)

Reaction temperature: 360° C.

Liquid space velocity: 1.39 hr$^{-1}$

Hydrogen pressure: 4.5 MPa

Hydrogen/oil ratio: 250 NL/L

<Measurement of the Pore Volume (PV) of the Hydrodesulfurization Catalysts>

The pore volume (PV) was measured and calculated by the pore-filling method using water.

<Measurement of the Specific Surface Area (SA) of the Hydrodesulfurization Catalysts>

The specific surface area (SA) was measured and calculated by the BET method using nitrogen adsorption by using the BERSORP-mini (manufactured by MicrotracBEL Corp., trade name).

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Carrier component (% by mass, on the basis of carrier) | Si: in terms of $SiO_2$ | 3.0 | 3.0 | 3.0 | 3.0 | 3.0 | 3.0 | 3.0 | 3.0 |
| | Ti: in terms of $TiO_2$ | 20 | 20 | 25 | 15 | 20 | 10 | 30 | 20 |
| | Al: in terms of $Al_2O_3$ | 77 | 77 | 72 | 82 | 77 | 87 | 67 | 77 |
| Production method | Addition completion time (min) | 30 | 30 | 30 | 30 | 30 | 30 | 30 | 30 |
| | Aging temperature (°C.) | 95 | 65 | 95 | 95 | 95 | 95 | 95 | 95 |
| Carrier property | Pv (ml/g) | 0.59 | 0.61 | 0.55 | 0.60 | 0.59 | 0.62 | 0.52 | 0.55 |
| | SA ($m^2$/g) | 308 | 317 | 293 | 314 | 308 | 336 | 267 | 272 |
| | UV absorption edge wavelength (nm) | 346 | 351 | 359 | 335 | 346 | 326 | 379 | 365 |
| Metal component (% by mass, on the basis of catalyst) | $MoO_3$ | 20 | 20 | 20 | 20 | 20 | 20 | 20 | 20 |
| | NiO | 0 | 0 | 0 | 0 | 1.5 | 0 | 0 | 0 |
| | CoO | 2.5 | 2.5 | 2.5 | 2.5 | 2.5 | 2.5 | 2.5 | 2.5 |
| $P_2O_5$ (% by mass, on the basis of catalyst) | | 2.5 | 2.5 | 2.5 | 2.5 | 2.5 | 2.5 | 2.5 | 2.5 |
| Catalyst property | PV (ml/g) | 0.45 | 0.47 | 0.42 | 0.46 | 0.45 | 0.48 | 0.40 | 0.42 |
| | SA ($m^2$/g) | 221 | 222 | 210 | 229 | 221 | 243 | 202 | 207 |
| Hydrodesulfurization activity | | 100 | 100 | 103 | 102 | 108 | 90 | 87 | 89 |
| Stability of hydrodesulfurization activity | | 95% | 93% | 94% | 93% | 94% | 85% | 90% | 87% |

The invention claimed is:

1. A hydrodesulfurization catalyst for hydrocarbon oil, the catalyst comprising:
    an inorganic oxide carrier comprising Si, Ti and Al; and
    at least one metal component, carried on the inorganic oxide carrier, being selected from the group consisting of group 6 elements, group 8 elements, group 9 elements and group 10 elements,
    wherein a content of Al in the inorganic oxide carrier is 50% by mass or higher in terms of $Al_2O_3$; a content of Si therein is 1.0 to 10% by mass in terms of $SiO_2$; and a content of Ti therein is 12 to 28% by mass in terms of $TiO_2$; and
    in the inorganic oxide carrier, an absorption edge wavelength of an absorption peak from Ti is 364 nm or shorter as measured by ultraviolet spectroscopy.

2. The hydrodesulfurization catalyst according to claim 1, wherein a specific surface area (SA) of the hydrodesulfurization catalyst is 150 $m^2$/g or larger, and a pore volume (PV) thereof is 0.30 ml/g or larger.

3. The hydrodesulfurization catalyst according to claim 1, wherein the metal component comprises at least one selected from the group consisting of molybdenum, tungsten, cobalt and nickel.

4. The hydrodesulfurization catalyst according to claim 1, wherein a content of the metal component is 1 to 35% by mass in terms of oxide.

5. A method for producing a hydrodesulfurization catalyst, the method comprising:
    mixing a first aqueous solution comprising a mineral acid salt of titanium and an acidic aluminum salt with a second aqueous solution comprising a basic aluminum salt to make a mixed liquid of pH 6.5 to 9.5 to thereby obtain a carrier precursor deposited in the mixed liquid, wherein a period of time is 60 min or shorter from when the mineral acid salt of titanium and the acidic aluminum salt are mixed until when the first aqueous solution and the second aqueous solution are mixed;
    calcining the carrier precursor to obtain a carrier;
    making the carrier to carry at least one metal component selected from the group consisting of group 6 elements, group 8 elements, group 9 elements and group 10 elements to obtain the hydrodesulfurization catalyst,
    wherein the first aqueous solution and/or the second aqueous solution comprises a silicate ion, and
    thereby producing a hydrodesulfurization catalyst of claim 1.

6. The method according to claim 5, wherein the first aqueous solution is prepared at 60° C. or lower.

* * * * *